(12) United States Patent
Upstill et al.

(10) Patent No.: US 10,339,144 B1
(45) Date of Patent: Jul. 2, 2019

(54) SEARCH OPERATION ADJUSTMENT AND RE-SCORING (71) Applicant: Google LLC, Mountain View, CA (US)

(72) Inventors: Trystan G. Upstill, Palo Alto, CA (US); Andre Duque Madeira, Cupertino, CA (US); Wisam Dakka, San Francisco, CA (US); Zhong Xiu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 614 days.

(21) Appl. No.: 14/718,845

(22) Filed: May 21, 2015

Related U.S. Application Data (60) Provisional application No. 62/001,433, filed on May 21, 2014.

(51) Int. Cl.
G06F 17/30 (2006.01)
G06F 16/2457 (2019.01)
G06F 16/951 (2019.01)

(52) U.S. Cl.
CPC ...... *G06F 16/24578* (2019.01); *G06F 16/951* (2019.01)

(58) Field of Classification Search
CPC .................. G06F 17/3053; G06F 17/30864
See application file for complete search history.

(56) References Cited

U.S. PATENT DOCUMENTS

| 6,526,440 | B1 | 2/2003 | Bharat | |
|---|---|---|---|---|
| 7,152,057 | B2 | 12/2006 | Brill | |
| 7,689,615 | B2 | 3/2010 | Burges | |
| 8,060,497 | B1 * | 11/2011 | Zatsman | G06F 17/30864 707/723 |
| 8,307,005 | B1 * | 11/2012 | He | G06F 17/30864 707/791 |
| 8,392,394 | B1 * | 3/2013 | Kumar | G06F 17/30864 707/706 |
| 2002/0069190 | A1 | 6/2002 | Geiselhart | |
| 2005/0246321 | A1 | 11/2005 | Mahadevan | |
| 2010/0262612 | A1 | 10/2010 | El-Saban | |
| 2013/0031032 | A1 * | 1/2013 | Mehta | G06F 17/30911 706/12 |

FOREIGN PATENT DOCUMENTS

WO WO2013075272 A1 5/2013

* cited by examiner

*Primary Examiner* — Apu M Mofiz
*Assistant Examiner* — Husam Turki Samara
(74) *Attorney, Agent, or Firm* — Fish & Richardson P.C.

(57) ABSTRACT

Methods, systems, and apparatus, including computer programs encoded on a computer storage medium, for receiving queries, and for each received query: receiving data indicating resources identified by a search operation as being responsive to the query, wherein the search operation scores each of the resources based, in part, on features of the resource and the query, selecting a subset of the resources, determining, from the subset of resources and for each of the features of the resources and the query, an impact measure that measures the impact of the feature on the ranking of the resources that belong to the subset, adjusting the search operation based on the respective impact measures, and initiating the search operation to re-score the resources in the subset of resources based, in part, on the adjustment and to rank the subset of resources according to a second order that is different from the first order.

14 Claims, 4 Drawing Sheets

SEARCH OPERATION ADJUSTMENT AND RE-SCORING

CLAIM OF PRIORITY

This application claims priority under 35 USC § 119(e) to U.S. Patent Application Ser. No. 62/001,433 filed on May 21, 2014, the entire contents of which are hereby incorporated by reference.

BACKGROUND

The Internet enables access to a wide variety of resources, such as video or audio files, web pages for particular subjects, book articles, or news articles. A search system can identify resources in response to a user query that includes one or more search terms or phrases. The search system ranks the resources based on their relevance to the query and importance and provides search results that link to the identified resources, and orders the search results according to the rank.

A search system uses a search operation to identify resources that are responsive to the query. The search operation takes into account features of the resources and the query, and perhaps other information, when generating search scores for the resources. Typically the search operation implements a robust search algorithm that performs well over a wide variety of resources. However, sometimes particular features for a particular query and a particular set of resources may be quite important in determining the search scores for the resources, while for other queries the particular features may be much less important. For example, for a particular query with certain terms, the presence of those terms in the resources may have a very strong impact on the search scores for the resources; conversely, for another query with different terms, the relative importance of the resources in an authority graph may have a much stronger impact on the search scores than the presence of query terms in the resources. However, the relative importance of particular features for particular queries and resources is often difficult, if not impossible, to predict a priori.

SUMMARY

This specification describes technologies relating to adjustments to a search operation and re-scoring of resources subsequent to the adjustments.

In general, one innovative aspect of the subject matter described in this specification can be embodied in methods that include the actions of receiving queries, each received query received from a corresponding user device, and for each received query: receiving data indicating resources identified by a search operation as being responsive to the query and ranked according to a first order, each resource having a corresponding search score by which the resources are ranked in responsiveness to the query relative to the other resources identified by the search operation as being responsive to the query, wherein the search operation scores each of the resources based, in part, on features of the resource and the query, selecting a set of the resources, determining, from the set of resources and for each of the features of the resources and the query, an impact measure that measures the impact of the feature on the ranking of the resources that belong to the set, re-scoring the resources for the query in the set of resources based, in part, on the impact measures and ranking the set of resources according to a second order that is different from the first order, and providing, to the user device in response to the query, search results according to the second order, each search result identifying a corresponding resource. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving queries, each received query received from a corresponding user device, and for each received query: receiving data indicating resources identified by a search operation as being responsive to the query and ranked according to a first order, each resource having a corresponding search score by which the resources are ranked in responsiveness to the query relative to the other resources identified by the search operation as being responsive to the query, wherein the search operation scores each of the resources based, in part, on features of the resource and the query that correspond to a set of search operation parameters, and wherein the search operation scores the resources based, in part, on a first set of search operation parameter values for the set of operation parameters, each parameter value corresponding to one of the search operation parameters in the set of search operation parameters, selecting a subset of the resources, determining, from the subset of resources and for each of the features of the resources and the query, an impact measure that measures the impact of the search operation parameter on the ranking of the resources that belong to the subset, adjusting the first set of search operation parameter values based on their respective impact measures to generate a second set of search operation parameter values, and initiating the search operation to re-score the resources for the query in the subset of resources based, in part, on the second set of search operation parameter values to rank the subset of resources according to a second order that is different from the first order. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A search operation may adjust to compensate for emergent phenomena that affect resource scoring. The adjustments can be determined at query time so that the foundational search operation need not be adjusted, and thus foundational search operation be built on known priors. This allows for the retention of the foundational search operation that performs well for most resources in a corpus given a set of known priors, but also provides flexibility to adjust the search operation on a per-query basis when particular features affect the ranking of resources in a way that departs from the expected effects. The re-ranking of resources resulting from scoring pursuant to the adjusted search operation tends to surface more prominently resources that are more likely to satisfy a user's informational need, thereby increasing the quality of the overall user experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A search operation implemented in a search engine scores resources based on features of the resource and the query. The features may include, for example, features related to information retrieval, such as features related to recall and precision, features related to the relative authority of a resource in a resource graph, features related to the query terms, and features related to user feedback of the resource given a query and other queries. These features may be model in the search engine as parameters, and various parameter values may be selected for each parameter. A feature value is then determined for each feature of a resource, and that feature value may be combined with the parameter value for the feature. For example, with respect to a resources authority score, a parameter value may be a weight by which a feature value for the resource—the authority score—is multiplied or otherwise adjusted; with respect to resource terms and query terms, parameter values may include synonyms, related terms, and weights by which matches of terms and term counts are multiple or otherwise adjusted; and so on.

The search operation may thus be a very complex operation that determines multiple scoring contributions corresponding to each parameter. Each scoring contribution is based, in part, on the parameter value(s) that correspond to the parameter, a feature value derived from the resource, and the content of the query.

The search operation, once built, tends to perform well over a wide variety of search queries and documents. However, sometimes for particular queries, or particular resources, some features may exhibit much more influence on the scoring of the resources than for other queries and other resources, and/or some features may exhibit much less influence on the scoring of the resources than for other queries and other resources. Furthermore, such influences may be evanescent; for example, for an emergent subject, an information retrieval score may be more influential for the first several weeks, and then, at a later time, authority scores and user feedback scores may tend to grow in influence. Thus, tuning a search operation to compensate for these features is difficult prior to their detection, if not impossible.

The systems and methods described below detect when certain features exhibit greater or lesser impacts on the ranking of resources for a search operation for a query, and then adjust a search operation based on the impacts. The adjusted search operation is the re-run on the identified resources to re-rank the resources in a manner that takes into account the detected impacts. In some implementations, an initial search for a query is executed, and a proper subset of the ranked resources, e.g., the top N ranked resources, is processed to determine appropriate modifications to the search operation. The search operation, adjusted by the appropriate modifications, is then re-run to re-score and re-rank the resources.

These features and additional features are described in more detail below.

Example Operating Environment

Figure 1:
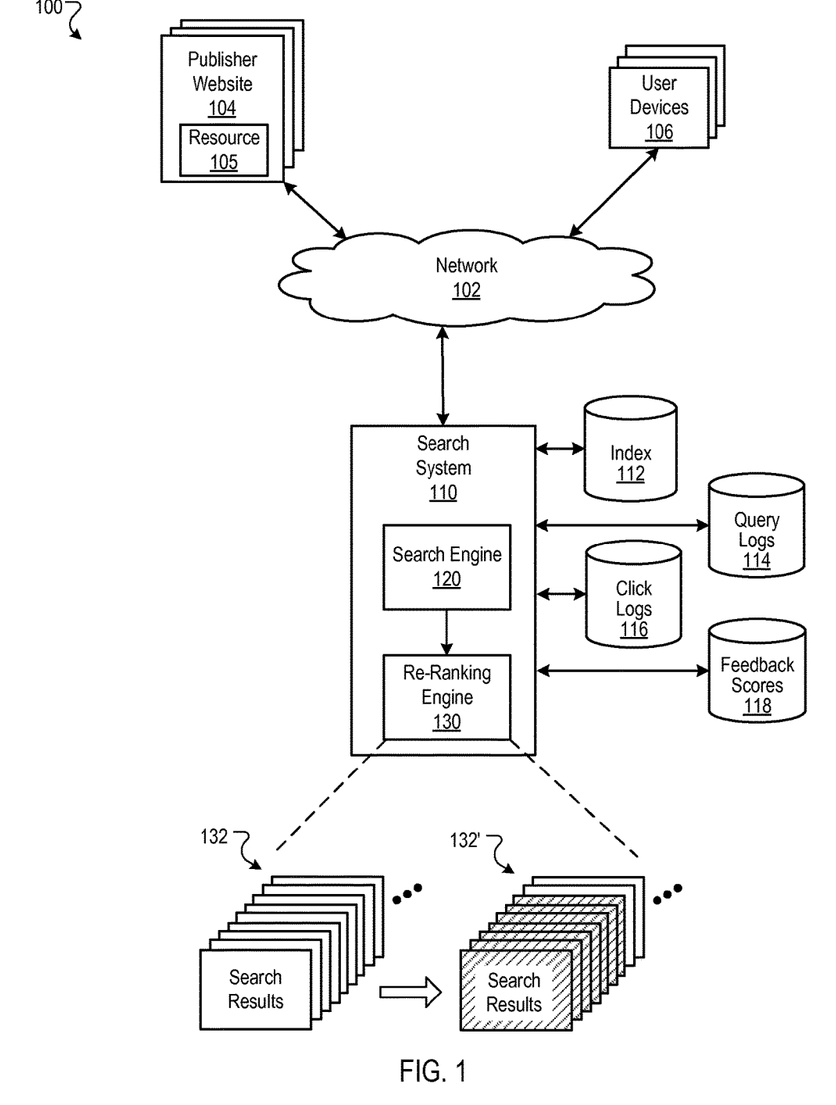
FIG. 1 is a block diagram of an example environment in which resources may be re-ranked based on an adjusted search operation.

FIG. 1 is a block diagram of an example environment 100 in which resources may be re-ranked based on an adjusted search operation. A computer network 102, such as the Internet, connects publisher websites 104, user devices 106, and a search system 110. The online environment 100 may include many thousands of publisher websites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher website 104 over the network 102 and that is associated with a resource address. Resources include HTML pages, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search system 110 identifies the resources by crawling the publisher websites 104 and indexing the resources provided by the publisher websites 104. The indexed data are stored in an index 112.

The user devices 106 submit search queries to the search system 110. In response to the queries, the search system 110 uses the index 112 to identify resources that are relevant to the queries. The search system 110 uses a search engine 120 that identify the resources in the form of search results 132 and returns the search results 132 to the user devices 106 in search results page resource. A search result is data generated by the search system 110 that identifies a resource that satisfies a particular search query, and includes a resource locator, or some other identifier, for the resource. An example search result can include a web page title, a snippet of text extracted from the web page, and the URL of the web page.

The search engine 120 utilizes a search operation that generates search scores for the resources, and ranks the resources based on search scores. The search operation quantifies the relevance of the resources to the query, and the quantification can be based on a variety of factors. Such factors include information retrieval ("IR") scores, user feedback scores, and optionally a separate ranking of each resource relative to other resources (e.g., an authority score). The search results 132 are ordered in a first order according to these search scores and provided to the user device according to the first order, or, in some situations, may be re-ranked by an adjusted search operation and provided to the user device as search results 132' ranked according to a second order that is different from the first order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Click data for the queries and the web pages referenced by the search results are stored in click logs 116. The query logs 114 and the click logs 116 define search history data that include data from and related to previous search requests. The query logs 114 and click logs 116 can be used to map queries submitted by the user devices to web pages that were identified in search results and the actions taken by users. The click logs 116 and query logs 114 can thus be used by the search system to determine queries submitted by the user devices, the actions taken in response to the queries, and how often the queries are submitted. Such information can be stored as feedback scores 118 for the queries and resources.

The search system 110 includes a re-ranking engine 130. As will be described in more detail below, the re-ranking engine 130, for each query, processes resources identified by a search operation as being responsive to the query and ranked according to the first order, selects a proper subset of the resources, and determines, for each feature the search operation takes into account, an impact measure that measures the impact of the feature on the ranking of the resources. The re-ranking engine 130 can then adjust the search operation based on the respective impact measures, and initiate a subsequent run of the search operation to re-score the resources based, in part, on the adjustment, resulting in the search results 132'.

The processes for determining when to adjust the search operation and re-rank the resource is described with reference to FIGS. 2-5 below.

Search Operation Adjustment and Re-Ranking Resources

Figure 2:
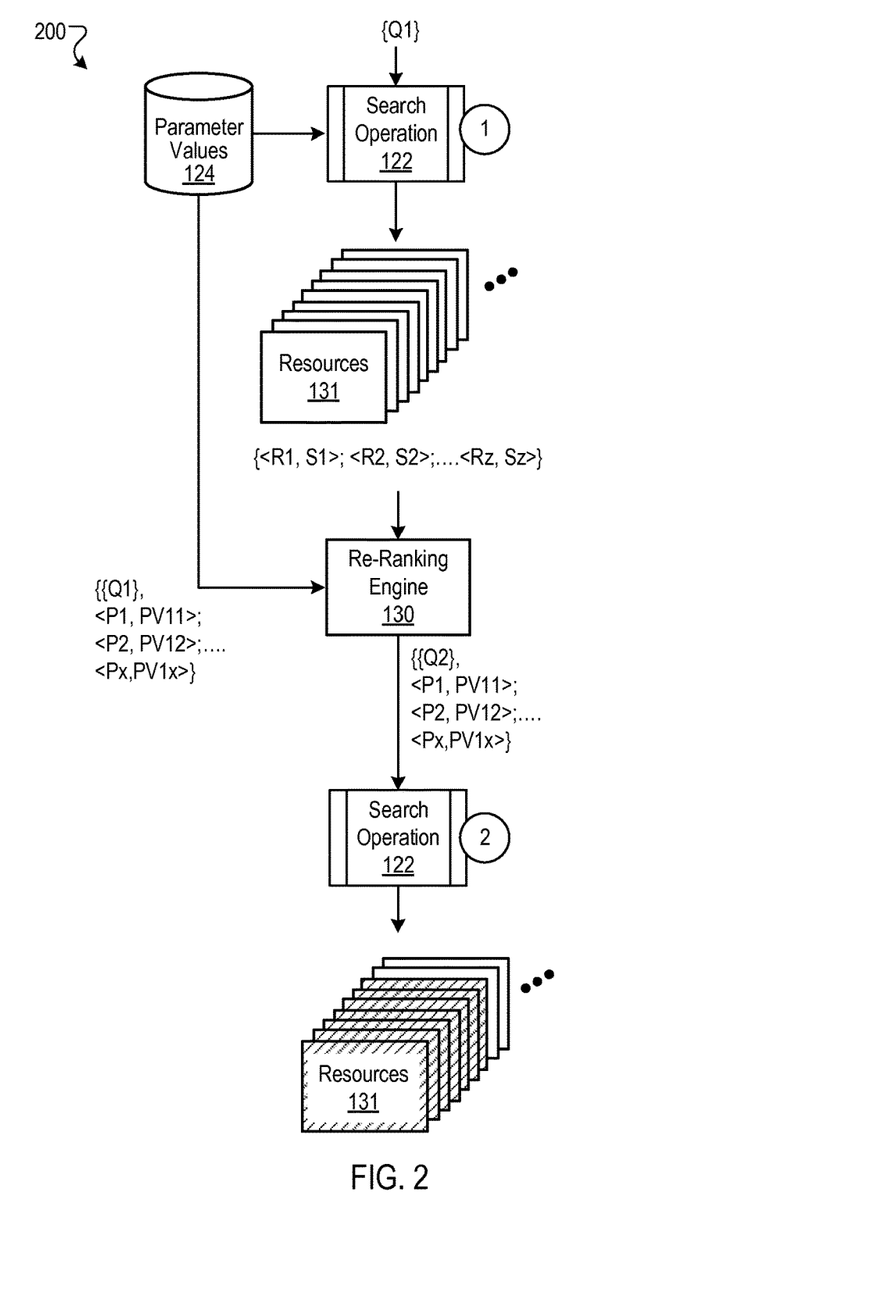
FIG. 2 is a system flow diagram of an adjustment of a search operation and the re-ranking of resources based on the adjusted search operation.

FIG. 2 is a system flow diagram 200 of an adjustment of a search operation and the re-ranking of resources based on the adjusted search operation. The system flow diagram 200 depicts a data and operation flow in the search system 110. Operation of the system flow diagram is described with reference to FIG. 3, which is a flow diagram of an example process 300 for adjusting a search operation and re-ranking resources based on the adjusted search operation. In some implementations, that process 300 is done for each query received; however, in FIG. 3, the process 300 is described in the context of a single query.

The search engine 110 receives a query {Q1} that has one or more terms and performs a search operation 122, as indicated by a first search operation instance 1. As described above, the search operation 122 takes into account various features related to the resources and the query. These features may be modeled in the search engine 110 as parameters, and various parameter values 124 may be specified for each parameter. A parameter value may be a numeric value, a logical value, a term, or some other value of a value type that can be processed by the search operation 122. Furthermore, a parameter value need not be one single value, but can be a collection values, such as a vector of values or terms.

The search operation 122 generates data indicating resources 131 identified by a search operation 122 as being responsive to the query {Q1} and ranked according to a first order. Each resource has a corresponding search score by which it is ranked in responsiveness to the query relative to the other resources. The search operation 122 scores each of the resources based, in part, on features of the resource and the query. This data is indicated by the set {<R1, S1>; <R2, S2>; ... <Rz, Sz>}, where Rn is the $n^{th}$ resource and Sn is the $n^{th}$ search score which corresponds to the $n^{th}$ resource.

Figure 3:
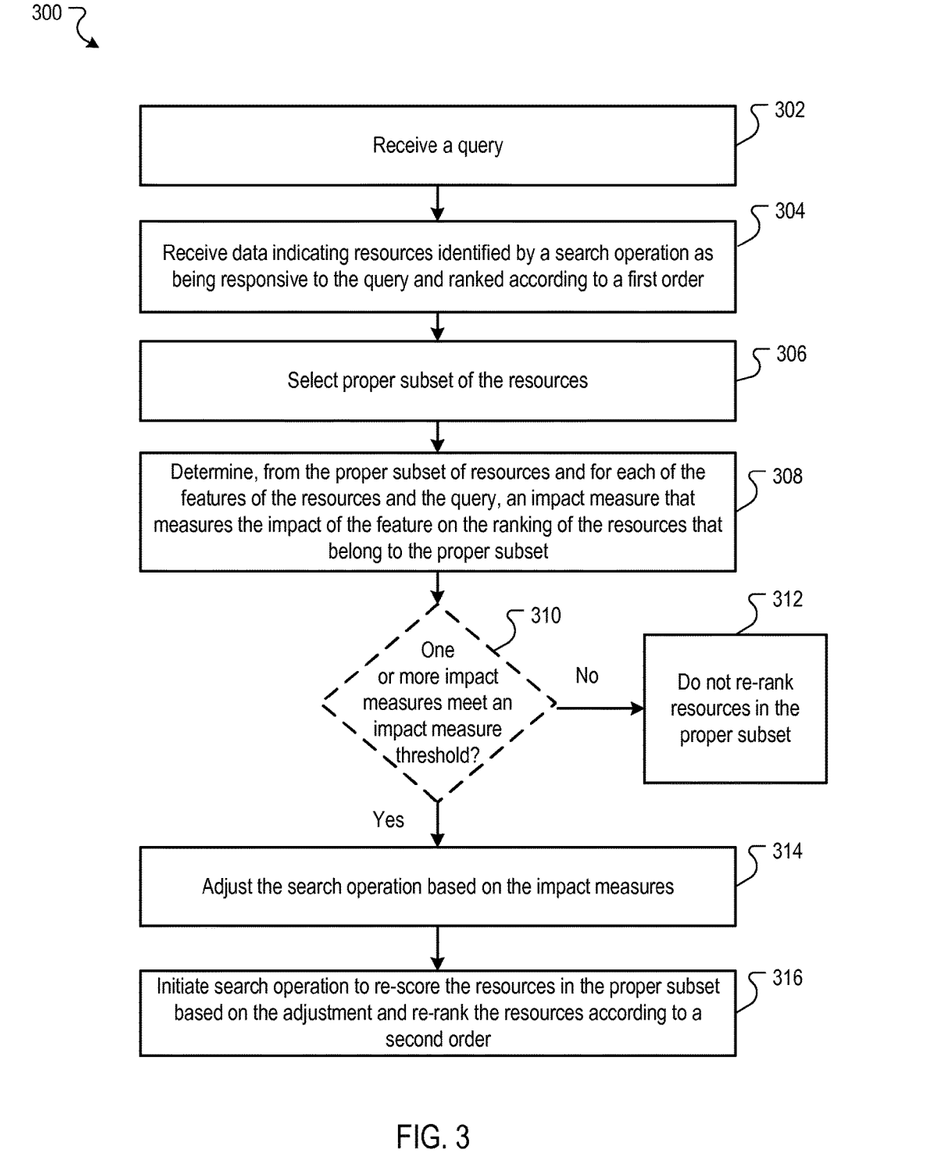
FIG. 3 is a flow diagram of an example process for adjusting a search operation and re-ranking resources based on the adjusted search operation.

After the search operation 122 is completed in the first instance, the process 300 is performed by the re-ranking engine 130. In operation, the process 300 receives the query {Q1} (302) and the data indicating resources 131 identified by the search operation 122 as being responsive to the query and ranked according to a first order (304).

The process 300 selects a proper subset of the resources (306). For example, the re-ranking engine 130 may select N resources ranked in the top N positions in the first order. Any appropriate value of N may be used. The value may be, for example, 100, or even a larger number, e.g., 1,000. Other values of N can also be used.

The process 300 then determines, from the proper subset of resources and for each of the features of the resources and the query, an impact measure that measures the impact of the feature on the ranking of the resources that belong to the proper subset (308). For each feature the re-ranking engine 130 processes, it will generate a corresponding impact measure for that feature. The impact measure may be, for example, a value in a range that measures the impact of the feature on the ranking of the resources. The range may have a lower bound indicative of very little to no effect on the search score, and an upper bound indicative of a very high effect on the search score and resulting ranking. Other impact measure scales and impact measure types can also be used. The impact measures may be determined in a variety of different ways. Two example processes for determining impact measures are described with reference to FIGS. 4 and 5 below.

In some implementations, the search operation is adjusted only if one or more impact measures meet an impact measure threshold (310). This decision process is optional, and can be omitted. However, the thresholding check can be used to preclude adjustments to the search operation and re-scoring resources when the impact measures indicate that a re-scoring of the resources is unlikely to result in appreciable changes to the rankings.

A variety of checks can be used to determine if an impact measure meets a threshold. For example, in some implementations, each feature may have a central tendency impact value, e.g., an average or median impact measure value, determined from corresponding impact measures for a large number of queries and corresponding scored resources. The impact measure for a particular query and resource set is then compared to its central tendency value, and if the impact measure deviates from the central tendency value by a threshold amount, e.g., 10%, or a more than a standard deviation, or some other threshold, then the impact measure meets the impact measure threshold.

In other implementations, an impact measure may meet a threshold if the impact measure indicates the feature has a disproportionate contribution to a search score. For example, each feature may have a central tendency contribution value, e.g., an average or median contribution score that is a measure of the feature's contribution to search score. The central tendency contribution value can be determined contribution measures for the feature for a large number of queries and corresponding scored resources. The impact measure may be, for example, a measure of the deviation of the contribution score for the feature for the particular query from the central tendency contribution value. If the impact measure indicates a deviation from the central tendency contribution value by a threshold amount, e.g., 10%, or more than a standard deviation, or some other threshold, then the impact measure meets the impact measure threshold.

Other appropriate ways of determining whether an impact measure meets an impact threshold can also be used.

If the impact measures do not meet the impact threshold, then the re-ranking engine 130 does not re-rank the resources in proper subset (312). Search results for the resources may then be provided to the user device that issued the query according to the first order.

Conversely, if one or more impact scores meet an impact measure threshold (or if this check is omitted), then the process 300 adjusts the search operation based on the impact measures (314). A variety of adjustments can be used. For example, depending on a category of the query, the search algorithm may be adjusted in different ways. By way of one example, if a query is categorized as being a "product" seeking query, then a relevance weight parameter value related to certain commercial content, such as reviews, pricing information, etc., may be increased; conversely, if a query is categorized as being an "informational" seeking query, then the relevance weight parameter value related to certain commercial content, such as reviews, pricing information, may be decreased, while a relevance weight parameter value related to anchor text linking to the resource may be increased, etc.

By way of another example, if an impact measure related to synonym matching terms is high, then the feature of query expansion may be adjusted such that a more aggressive form of query expansion is used.

More generally, the features of the resources and the query may correspond to a set of search operation parameters, and, in the first instance of the search operation 122, the search operation 122 scores the resources based on a first set of search operation parameter values for the set of operation parameters. This in indicated in FIG. 2 by the query and parameter value set of $\{\{Q1\}, <P1, PV11>; <P2, PV12>; \ldots <Px,PV1x>\}$, where Pn is an $n^{th}$ parameter and PV1n is parameter value for the $n^{th}$ parameter Pn. As described above, each parameter value PV may be a single value, or may be a vector of values, or may be any other type of data, such as a setting, that the search operation 122 takes into account when scoring resources for a query.

The impact measure thus measures the impact of the search operation parameter on the ranking of the resources that belong to the proper subset. The adjustment to the search operation may, for example, be an adjustment of a search operation parameter value based on its respective impact measure. The adjustments thus yield a second set of search operation parameter values, as indicated by the parameter value set $\{\{Q2\}, <P1, PV21>; <P2, PV12>; \ldots <Px,PV2x>\}$. Again, Pn is an $n^{th}$ parameter and PV2n is parameter value for the $n^{th}$ parameter Pn; however, PV2n may be a different value than PV1n due to an adjustment.

The adjustment of a parameter value can vary according to the parameter type and the impact measure. For example, for quantitative parameter types and value, such as numeric parameter values related to relevance weights, limits, etc., the parameter value may be adjusted in direct proportion (or inverse proportion) to the magnitude of the impact measure. For other parameter types, such as descriptors, degrees of query expansion, etc., the parameter value may be adjusted in a binary fashion, such as to eliminate a scoring feature, or may be adjusted in some other way, such as optionalizing certain terms of a query so that the absence of the term in a resource does not negatively affect a search score for the resource.

The process 300 then initiates the search operation 122 to re-score the resources in the proper subset of resources based on the adjustment, and to re-rank the resources according to a resulting second order (316). The re-scoring and re-ranking of the resources according to the adjusted search operation is indicated by the second search operation instance 2.

In some implementations, only the proper subset of resources are re-scored, as indicated by the shaded proper subset of search results in FIG. 1 and the shaded proper subset of resources in FIG. 2. In other implementations, however, an entire set of resources, e.g., an entire search corpus, can be searched using the adjusted search operation, and is not limited to only resources in the proper subset.

Determining Impact Measures

Figure 4:
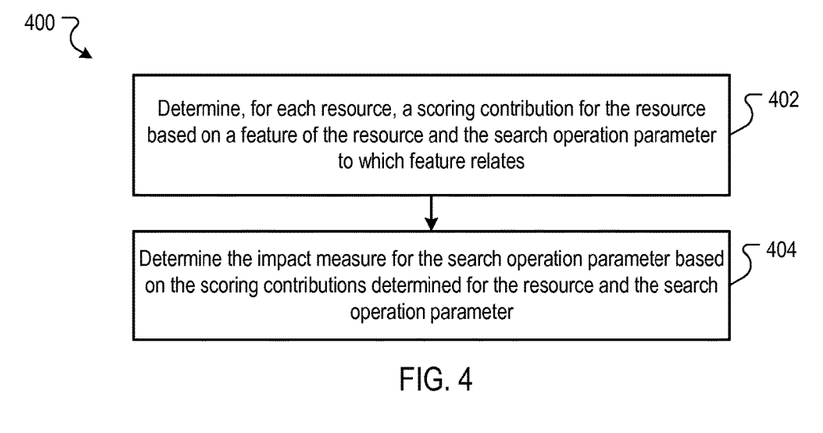
FIG. 4 is a flow diagram of an example process for determining impact measures.
Figure 5:
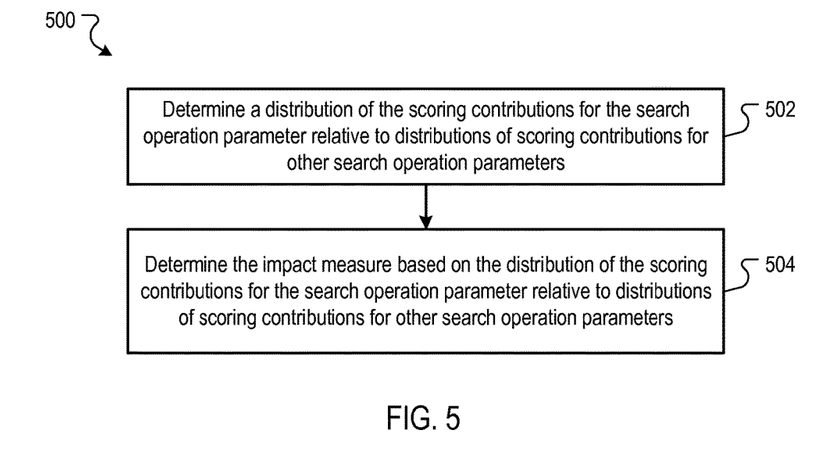
FIG. 5 is a flow diagram of another example process for determining impact measures.

As described above, impact measures can be determined in a variety of ways, and two examples are described in FIGS. 4 and 5. In FIG. 4, for example, the impact measure is determined based on a scoring contribution for a feature to a search score, and in FIG. 5 the impact measure is determined based on a scoring contribution of a feature for a query relative to the scoring contributions of the feature for other queries.

In FIG. 4, the process 400 determines, for each resource, a scoring contribution for the resource based on a feature of the resource and the search operation parameter to which the features relates (402). For example, a search operation may generate a search score based on a feature set, e.g., $$SS = f(F1, F2 \ldots Fn)$$

Where:
SS is the search score;
f( ) is a function; and
F1 . . . Fn are various feature values relating to the query and the resource for which the search score SS is determined.

The scoring contribution for a particular feature may be determined, for example, by a single-variable analysis of the feature over the search score for the resource. For example, for a resource, a feature value determined for the resource may be adjusted to determine the effect of the feature on the search score relative to the adjustments of other feature values on the search score. Other ways of determining a scoring contribution can also be used.

The process 400 determines the impact measure for the search operation parameter based on the scoring contributions determined for the resource and the search operation parameter value (404). For example, for the feature to which the search operation parameter corresponds, the scoring contributions for each resource are processed to generate the impact measure. A central tendency of the scoring contributions may be determined. Alternatively, a measure of the scoring contributions for the search operation parameter relative to the scoring contributions of other search operation parameters may be determined.

By way of another example, the re-ranking engine 130 may determine a correlation measure for the search operation parameter based on a correlation of the scoring contributions to the resources and the search scores of the resources. A very strong correlation may indicate the feature to which the search operation parameter corresponds has a very strong effect, while a very low correlation may indicate the feature has little influence on the search score.

Another way of determining an impact measure is by comparing the scoring contributions of a feature to the scoring contributions of other features. In FIG. 5, for example, the process 500 determines a distribution of the scoring contributions for the search operation parameter relative to distributions of scoring contributions for other search operation parameter values (502). For example, for each parameter, a histogram may be generated that illustrates the effect of a feature to which the parameter corresponds on the search scores of the resources in the proper subset.

The process 500 determines the impact measure based on the distribution of the scoring contributions for the search operation parameter value relative to distributions of scoring contributions for other search operation parameter values (504). For example, from the histograms, the effect of each feature relative to the effect of each other feature on the search scores can be quantified. To illustrate, assume that a first parameter is an authority score of a resource, and a second parameter is the relevance of the query text to the anchor text of anchors that link to the resource. A first histogram may illustrate that the authority score of resources is much more determinative of a search score of the resource that is the relevance of the query text to the anchor text of anchors that link to the resource. Accordingly, a parameter value for an authority score may be adjusted upward, or a parameter value for the relevance of the query text to the anchor text may be adjusted downward, or both adjustments may be made.

Additional Implementation Details

In situations in which the systems discussed here collect personal information about users, or may make use of personal information, subject to appropriate policies. In addition, certain data may be treated in one or more ways before it is stored or used, so that personally identifiable information is secured and encrypted. For example, a user's identity may be secured and encrypted so that no personally identifiable information can be determined for the user, or a user's geographic location may be secured and encrypted, so that a particular location of a user cannot be determined. Furthermore, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving queries, each received query received from a corresponding user device and for each received query:
   receiving data indicating resources identified by a search operation as being responsive to the query and ranked according to a first order, each resource having a corresponding search score by which the resources are ranked in responsiveness to the query relative to the other resources identified by the search operation as being responsive to the query, wherein the search operation scores each of the resources based, in part, on features of the resource and the query;
   selecting a set of the resources;
   determining, from the set of the resources and for each of the features of the resources and the query, a respective impact measure that measures the impact of the feature on the ranking, for the query and relative to historical queries stored in a query log based on a scoring contribution of the feature for the query relative to scoring contributions of the feature for the historical queries, of the resources that belong to the set;
   determining that at least one respective impact measure for at least one of the features of the resources and the query meets a corresponding impact measure threshold;
   in response to a determination that at least one respective impact measure for the at least one of the features of the resources and the query meets the corresponding impact threshold, re-scoring the resources for the query in the set of the resources based, in part, on the impact measures and ranking the set of the resources according to a second order that is different from the first order;
   and providing, to the user device in response to the query, search results according to the second order, each search result identifying a corresponding resource.

2. A method performed by data processing apparatus, the method comprising:
   receiving queries, each received query received from a corresponding user device; and for each received query:
   receiving data indicating resources identified by a search operation as being responsive to the query and ranked according to a first order, each resource having a corresponding search score by which the resources are ranked in responsiveness to the query relative to the other resources identified by the search operation as being responsive to the query, wherein the search operation scores each of the resources based, in part, on features of the resource and the query that correspond to a set of search operation parameters, and wherein the search operation scores the resources based, in part, on a first set of search operation parameter values for the set of operation parameters, each parameter value corresponding to one of the search operation parameters in the set of search operation parameters;

selecting a subset of the resources;

determining, from the subset of the resources and for each of the features of the resources and the query, a respective impact measure that measures the impact of the search operation parameter on the ranking, for the query and relative to historical queries stored in a query log based on a scoring contribution of the feature for the query relative to scoring contributions of the feature for the historical queries, of the resources that belong to the subset;

determining that at least one respective impact measure for at least one of the features of the resources and the query meets a corresponding impact measure threshold;

in response to a determination that at least one impact measure for at least one of the features of the resources and the query meets the corresponding impact measure threshold, adjusting the first set of search operation parameter values based on their respective impact measures to generate a second set of search operation parameter values;

and initiating the search operation to re-score the resources for the query in the subset of the resources based, in part, on the second set of search operation parameter values to rank the subset of the resources according to a second order that is different from the first order.

3. The method of claim 2, wherein selecting the subset of the resources comprises selecting N resources ranked in the top N positions in the first order.

4. The method of claim 3, wherein determining for each of the search operation parameters the respective impact measure that measures the impact of the search operation parameter to the ranking of the resources that belong to the subset comprises, for each search operation parameter:

determining, for each resource, a scoring contribution for the resource based on a feature of the resource and the search operation parameter to which features relates;

and determining the respective impact measure for the search operation parameter based on the scoring contributions determined for the resources and the search operation parameter.

5. The method of claim 4, wherein determining the respective impact measure for the search operation parameter based on the scoring contributions determined for the resources and the search operation parameter comprises determining a correlation measure for the search operation parameter based on a correlation of the scoring contributions to the resources and the search scores of the resources.

6. The method of claim 4, wherein determining the respective impact measure for the search operation parameter based on the scoring contributions determined for the resources and the search operation parameter value comprises:

determining a distribution of the scoring contributions for the search operation parameter relative to distributions of scoring contributions for other search operation parameters;

and determining the respective impact measure based on the distribution of the scoring contributions for the search operation parameter relative to distributions of scoring contributions for other search operation parameter.

7. The method of claim 4, wherein the search operation parameter values include term weights of resource terms and query terms.

8. The method of claim 4, wherein the search operation parameter values include authority weights for authority scores of resources, each authority score measuring an authority of a resource relative to other resources.

9. The method of claim 4, wherein the search operation parameter values include a user feedback signal weight for a user feedback signal for each resource, the user feedback signal being based on a selection rate of the resource in response to a search operation for which a search result referencing the resource is selected.

10. The method of claim 2, comprising:

for each query, determining whether to re-score the resources in the subset of the resources based on the respective impact measures;

and only for each received query for which the resources in the subset of the resources are determined to be re-scored, performing the adjusting of the first set of search operation parameter values and initiating the search operation to re-score the resources in the subset of the resources.

11. The method of claim 10, wherein determining whether to re-score the resources in the subset of the resources based on the respective impact measures comprises:

determining not to re-score the resources when none of the respective impact measures meets the corresponding impact threshold.

12. The method of claim 2, wherein initiating the search operation to re-score the resources in the subset of the resources based, in part, on the second set of search operation parameter values and to rank the subset of the resources according to a second order that is different from the first order further comprises initiating the search operation to re-score the resources in the subset of the resources and additional resources not in the subset.

13. A computer storage medium encoded with a computer program, the program comprising instructions that when executed by data processing apparatus cause the data processing apparatus to perform operations comprising:

receiving queries, each received query received from a corresponding user device; and for each received query:

receiving data indicating resources identified by a search operation as being responsive to the query and ranked according to a first order, each resource having a corresponding search score by which the resources are ranked in responsiveness to the query relative to the other resources identified by the search operation as being responsive to the query, wherein the search operation scores each of the resources based, in part, on features of the resource and the query that correspond to a set of search operation parameters, and wherein the search operation scores the resources based, in part, on a first set of search operation parameter values for the set of operation parameters, each parameter value corresponding to one of the search operation parameters in the set of search operation parameters;

selecting a subset of the resources;

determining, from the subset of the resources and for each of the features of the resources and the query, a respective impact measure that measures the impact of the search operation parameter on the ranking, and relative to historical queries stored in a query log based on a scoring contribution of the feature for the query relative to scoring contributions of the feature for the historical queries, of the resources that belong to the subset;

determining that at least one respective impact measure for at least one of the features of the resources and the query meets a corresponding impact measure threshold;

in response to a determination that at least one impact measure for at least one of the features of the resources and the query meets the corresponding impact threshold, adjusting the first set of search operation parameter values based on their respective impact measures to generate a second set of search operation parameter values;

and initiating the search operation to re-score the resources for the query in the subset of the resources based, in part, on the second set of search operation parameter values to rank the subset of the resources according to a second order that is different from the first order.

14. A system, comprising:

a data processing apparatus; and software stored in non-transitory computer readable storage medium storing instructions executable by the data processing apparatus and that upon such execution cause the data processing apparatus to perform operations comprising:

receiving queries, each received query received from a corresponding user device; and for each received query:

receiving data indicating resources identified by a search operation as being responsive to the query and ranked according to a first order, each resource having a corresponding search score by which the resources are ranked in responsiveness to the query relative to the other resources identified by the search operation as being responsive to the query, wherein the search operation scores each of the resources based, in part, on features of the resource and the query that correspond to a set of search operation parameters, and wherein the search operation scores the resources based, in part, on a first set of search operation parameter values for the set of operation parameters, each parameter value corresponding to one of the search operation parameters in the set of search operation parameters;

selecting a subset of the resources;

determining, from the subset of the resources and for each of the features of the resources and the query, a respective impact measure that measures the impact of the search operation parameter on the ranking, for the query and relative to historical queries stored in a query log based on a scoring contribution of the feature for the query relative to scoring contributions of the feature for the historical queries, of the resources that belong to the subset;

determining that at least one respective impact measure for at least one of the features of the resources and the query meets a corresponding impact measure threshold;

in response to a determination that at least one impact measure for at least one of the features of the resources and the query meets the corresponding impact threshold, adjusting the first set of search operation parameter values based on their respective impact measures to generate a second set of search operation parameter values;

and initiating the search operation to re-score the resources for the query in the subset of the resources based, in part, on the second set of search operation parameter values to rank the subset of the resources according to a second order that is different from the first order.

* * * * *

UNITED STATES PATENT AND TRADEMARK OFFICE
CERTIFICATE OF CORRECTION

| | |
|---|---|
| PATENT NO. | : 10,339,144 B1 |
| APPLICATION NO. | : 14/718845 |
| DATED | : July 2, 2019 |
| INVENTOR(S) | : Upstill et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this
Nineteenth Day of May, 2020

Andrei Iancu
*Director of the United States Patent and Trademark Office*